(12) United States Patent
Hwang et al.

(10) Patent No.: US 9,046,695 B2
(45) Date of Patent: Jun. 2, 2015

(54) IMAGE DISPLAY DEVICE INCLUDING AUXILIARY DISPLAY UNITS IN PIXELS FOR IMPROVING 2D/3D IMAGE DISPLAY

(75) Inventors: Kwangjo Hwang, Anyang-si (KR); Euitae Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 261 days.

(21) Appl. No.: 13/543,607

(22) Filed: Jul. 6, 2012

(65) Prior Publication Data
US 2013/0009941 A1    Jan. 10, 2013

(30) Foreign Application Priority Data
Jul. 6, 2011    (KR) .......................... 10-2011-0067010

(51) Int. Cl.
 *G09G 5/00*  (2006.01)
 *G02B 27/26*  (2006.01)
 *H04N 13/04*  (2006.01)
 *G09G 3/00*  (2006.01)
(52) U.S. Cl.
 CPC ............ *G02B 27/26* (2013.01); *H04N 13/0434* (2013.01); *H04N 13/0452* (2013.01); *H04N 13/0497* (2013.01); *G09G 3/003* (2013.01); G09G 2300/0439 (2013.01); G09G 2300/0861 (2013.01); G09G 2320/028 (2013.01); G09G 2310/061 (2013.01)
(58) Field of Classification Search
 CPC .......... G09G 2330/021; G09G 3/3696; G09G 3/3233

USPC ........................ 345/211, 212, 419; 349/96, 98
See application file for complete search history.

(56) References Cited

U.S. PATENT DOCUMENTS

| 2010/0265230 A1* | 10/2010 | Kang ............................ 345/211 |
| 2011/0234605 A1* | 9/2011 | Smith et al. .................... 345/522 |
| 2012/0013610 A1* | 1/2012 | Chae ............................. 345/419 |
| 2012/0013656 A1* | 1/2012 | Chae ............................. 345/694 |
| 2012/0032949 A1* | 2/2012 | Lim et al. ...................... 345/419 |

FOREIGN PATENT DOCUMENTS

CN           101888564 A     11/2010

OTHER PUBLICATIONS

Office Action issued in corresponding Chinese Patent Application No. 201210214262.9, mailed Apr. 2, 2014, 11 pages.

* cited by examiner

*Primary Examiner* — Jonathan Blancha
(74) *Attorney, Agent, or Firm* — Brinks Gilson & Lione

(57) ABSTRACT

An image display device includes a display panel which includes a plurality of pixels and operates in a 2D mode and a 3D mode, a patterned retarder for dividing light from the display panel into first polarized light and second polarized light, and a control voltage generator which generates a first DC control voltage of an off-level and a second DC control voltage of a slight-on level, which is higher than the off-level and is lower than a full-on level, and selectively outputs the first DC control voltage and the second DC control voltage depending on a driving mode. Each of the plurality of pixels includes an upper display unit and a lower display unit, which are vertically disposed in a mirror form.

10 Claims, 15 Drawing Sheets

IMAGE DISPLAY DEVICE INCLUDING AUXILIARY DISPLAY UNITS IN PIXELS FOR IMPROVING 2D/3D IMAGE DISPLAY

This application claims the benefit of Korean Patent Application No. 10-2011-0067010 filed on Jul. 6, 2011, which is incorporated herein by reference for all purposes as if fully set forth herein.

BACKGROUND

1. Field of the Disclosure

Embodiments of the disclosure relate to an image display device capable of selectively implementing a two-dimensional plane image (hereinafter referred to as '2D image') and a three-dimensional stereoscopic image (hereinafter referred to as '3D image').

2. Discussion of the Related Art

Recently, image display devices may selectively implement a 2D image and a 3D image due to the development of various contents and circuit technology. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

An LC shutter glasses type image display device alternately displays a left eye image and a right eye image on a display element every one frame and opens and closes a left eyeglass and a right eyeglass of LC shutter glasses in synchronization with a display timing, thereby implementing the 3D Image. The LC shutter glasses open only the left eyeglass during odd-numbered frame periods, in which the left eye image is displayed, and open only the right eyeglass during even-numbered frame periods, in which the right eye image is displayed, thereby making binocular disparity in a time division method. In the LC shutter glasses type image display device, because the LC shutter glasses are turned on in a short period of time, the luminance of the 3D image is low. Further, an extreme amount of 3D crosstalk is generated because of the synchronization between the display element and because of the LC shutter glasses and the On/Off conversion response characteristic.

As shown in FIG. 1, a polarized glasses type image display device includes a patterned retarder 2 attached to a display panel 1. The polarized glasses type image display device alternately displays left eye image data L and right eye image data R on the display panel 1 every one horizontal line and converts polarization characteristics of light incident on polarized glasses 3 using the patterned retarder 2. Through such an operation of the polarized glasses type image display device, a left eye image and a right eye image may be spatially divided, thereby implementing a 3D image.

In the polarized glasses type image display device, because the left eye image and the right eye image are adjacently displayed on the adjacent horizontal lines of the display panel 1, the range of a vertical viewing angle, in which a crosstalk is not generated, is very narrow. The crosstalk is generated when a doubled image of the left eye image and the right eye image is displayed at a location of the vertical viewing angle. To prevent the crosstalk in the polarized glasses type image display device, as shown in FIG. 2, a method for forming black stripes BS in an area of a patterned retarder 2 to thereby widen a vertical viewing angle of the 3D image had been proposed, for example, in Japanese Laid Open Publication No. 2002-185983. However, the black stripes BS of the patterned retarder 2 used to widen the vertical viewing angle cause side effects resulting in a large reduction in a luminance of a 2D image.

SUMMARY

Embodiments of the invention provide an image display device capable of widening a vertical viewing angle of a 3D image without a reduction in a luminance of a 2D image.

In one aspect, there is an image display device including a display panel including a plurality of pixels and configured to operate in a 2D mode and a 3D mode, a patterned retarder configured to divide light from the display panel into first polarized light and second polarized light, and a control voltage generator configured to generate a first DC control voltage of an off-level and a second DC control voltage of a slight-on level, which is higher than the off-level and is lower than a full-on level, and selectively output the first DC control voltage and the second DC control voltage depending on a driving mode, wherein each of the plurality of pixels includes an upper display unit and a lower display unit, which are vertically disposed in a mirror form, wherein the upper display unit includes an upper main display unit and an upper auxiliary display unit which are adjacent to each other, and the lower display unit includes a lower main display unit and a lower auxiliary display unit which are adjacent to each other, wherein the lower main display unit is disposed on a lower side of the upper main display unit along a vertical direction, and the upper auxiliary display unit and the lower auxiliary display unit are disposed adjacent to each other between the upper main display unit the lower main display unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will noted that detailed description of known art will be omitted if it is determined that the art can mislead the embodiments of the invention.

Example embodiments of the invention will be described with reference to FIGS. 3 to 17.

Figure 1:
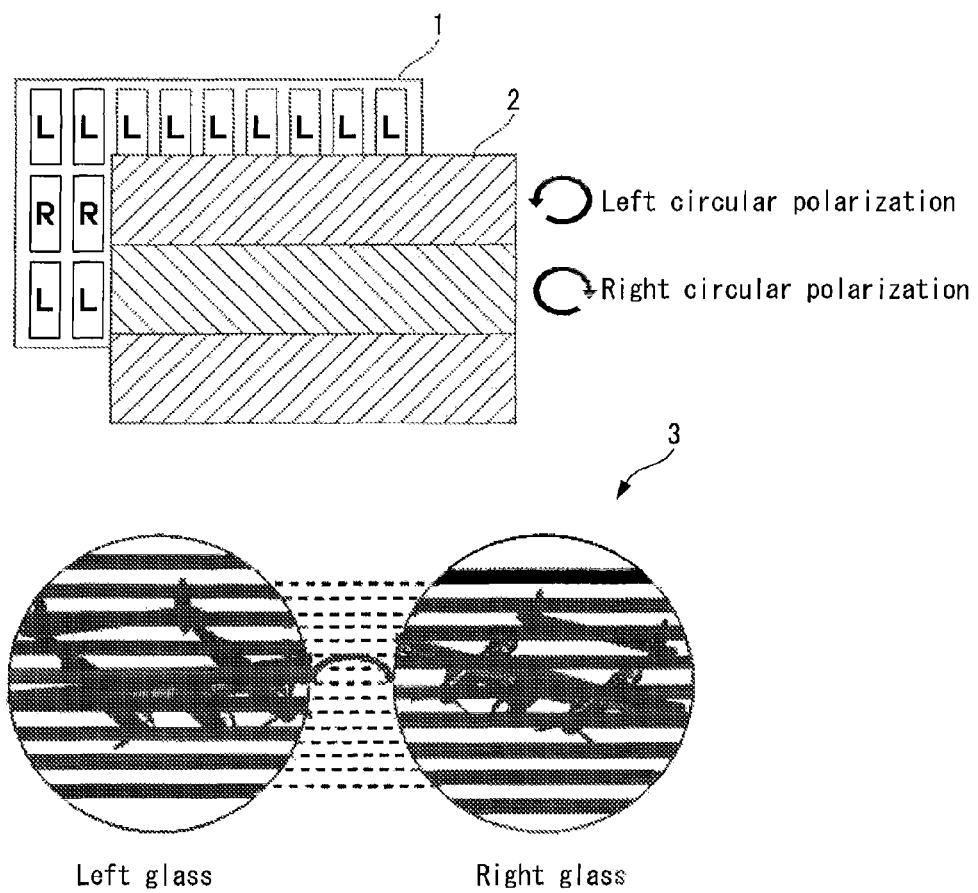
FIG. 1 illustrates a related a t polarized glasses type image display device.
Figure 2:
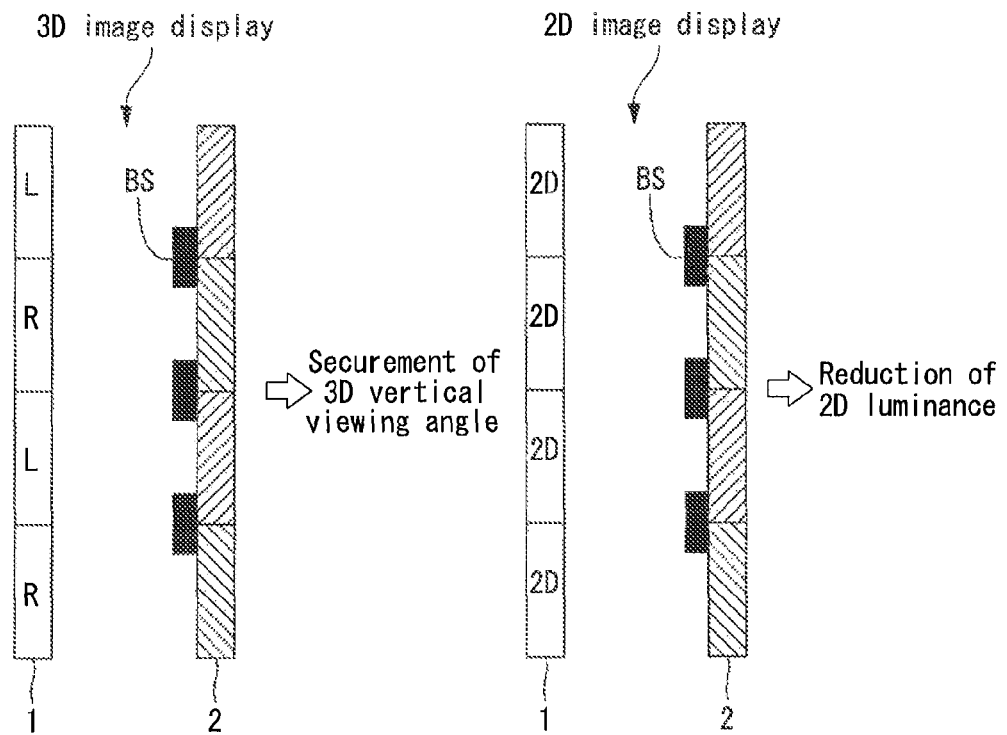
FIG. 2 illustrates that a luminance of a 2D image is reduced by black stripes used to widen a vertical viewing angle in a related art polarized glasses type image display device.
Figure 3:
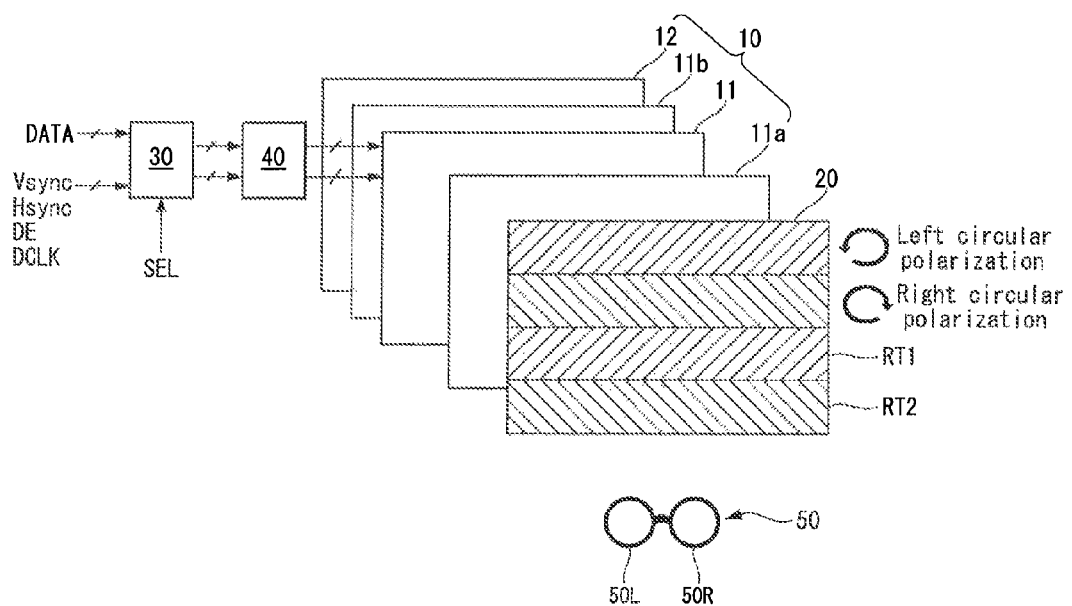
FIGS. 3 and 4 illustrate a polarized glasses type image display device according to an example embodiment of the invention.
Figure 4:
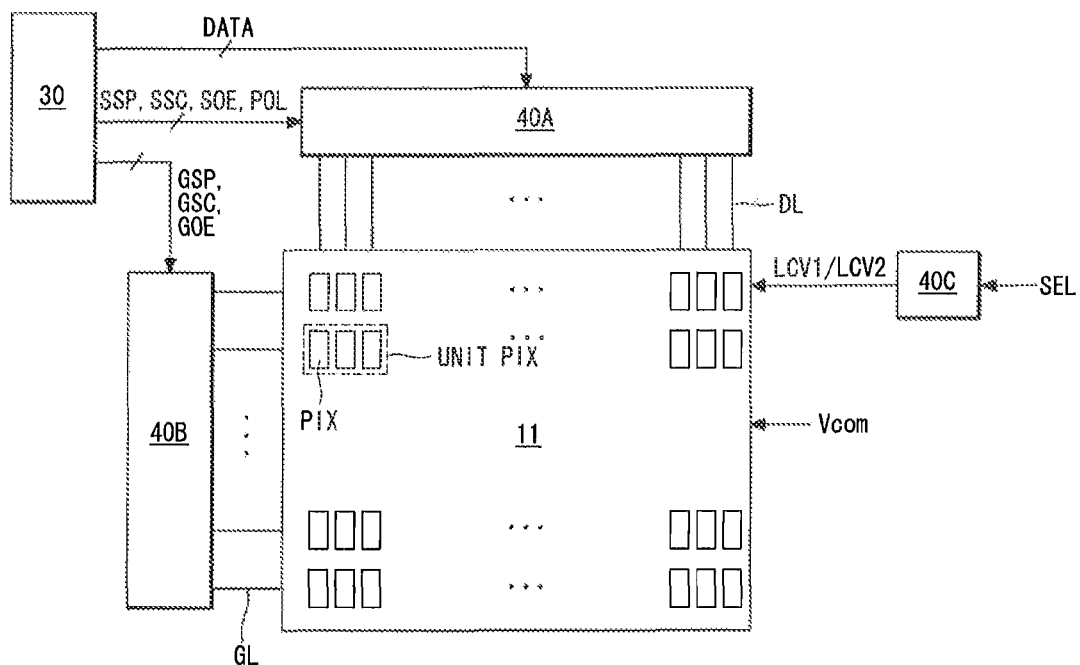

FIGS. 3 and 4 illustrate a polarized glasses type image display device according to an example embodiment of the invention.

As shown in FIGS. 3 and 4, the image display device according to the embodiment of the invention includes a display element 10, a patterned retarder 20, a controller 30, a panel driver 40, and polarized glasses 50.

The display element 10 may be implemented as a flat panel display such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the image display device according to the embodiment of the invention is described using the liquid crystal display as the display element 10.

The display element 10 includes a display panel 11, an upper polarizing film 11a, and a lower polarizing film 11b.

Figure 5A:
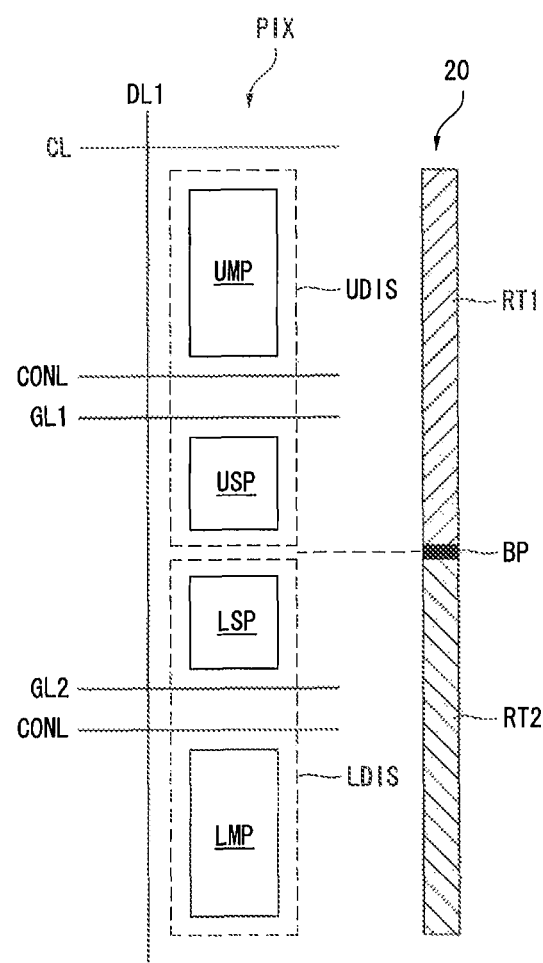
FIG. 5A illustrates one of red, green, and blue pixels shown in FIG. 4.

The display panel 11 includes an upper glass substrate, a lower glass substrate, and a liquid crystal layer between the upper and lower glass substrates. A plurality of data lines DL and a plurality of gate lines GL crossing the plurality of data lines DL are disposed on the lower glass substrate of the display panel 11. A plurality of unit pixels UNIT PIX are disposed on the display panel 11 in a matrix form based on a crossing structure between the data lines DL and the gate lines GL, thereby constituting a pixel array. Each of the unit pixels UNIT PIX includes three pixels PIX for respectively displaying red, green, and blue images. As shown in FIG. 5A, each pixel PIX includes an upper display unit UDIS and a lower display unit LDIS which are disposed in a mirror form. Each of the upper display unit UDIS and the lower display unit LDIS includes a main display unit and an auxiliary display unit. Common lines, to which a common voltage Vcom is supplied, and discharge control lines, to which first and second DC control voltages LCV1 and LCV2 are supplied, are formed on the lower glass substrate of the display panel 11.

Black matrixes and color filters are formed on the upper glass substrate of the display panel 11.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 110. In a vertical electric field driving manner such as a twisted nematic (TN) mode and a vertical alignment (VA) mode, the common electrodes may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of the liquid crystal cells of the display panel 11 constant.

The display element 10 according to the embodiment of the invention may be implemented as any type liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

The patterned retarder 20 is attached to the upper polarizing film 11a of the display panel 11. The patterned retarder 20 includes a plurality of first retarders RT1, which are respectively formed on odd-numbered lines of the patterned retarder 20, and a plurality of second retarders RT2, which are respectively formed on even-numbered lines of the patterned retarder 20. Light absorption axes of the first retarders RT1 are different from light absorption axes of the second retarders RT2. The first retarders RT1 retard a phase of linearly polarized light incident through the upper polarizing film 11a by a quarter wavelength and transmit it as first polarized light (for example, left-circularly polarized light). The second retarders RT2 retard a phase of linearly polarized light incident through the upper polarizing film 11a by three-quarter wavelength and transmit it as second polarized light (for example, right-circularly polarized light).

The controller 30 controls an operation of the panel driver 40 in a 2D mode and a 3D mode in response to a mode selection signal SEL. The controller 30 receives the mode selection signal SEL through a user interface such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides 3D image data received from a video source into RGB data of a left eye image and RGB data of a right eye image. Then, the controller 30 supplies the RGB data of the left eye image and the RGB data of the right eye image to the panel driver 40. In the 2D mode, the controller 30 supplies RGB data of a 2D image received from the video source to the panel driver 40.

The controller 30 generates control signals for controlling operation timing of the panel driver 40 using timing signals such as a vertical sync signal Vsync, a horizontal sync signal Hsync, a data enable DE, and a dot clock DCLK.

A data control signal for controlling operation timing of a data driver 40A of the panel driver 40 includes a source start pulse SSP, a source sampling clock SSC, a source output enable SOE, a polarity control signal POL, and the like. The source start pulse SSP indicates a supply start time point of data corresponding to one horizontal line in one horizontal period during which the data corresponding to the one horizontal line is displayed. The source sampling clock SSC controls a latch operation of data based on a rising or failing edge thereof. The source output enable SOE controls an output of the data driver 40A. The polarity control signal POL controls a polarity of a data voltage to be supplied to the liquid crystal cells of the display panel 11.

A gate control signal for controlling operation timing of a gate driver 40B of the panel driver 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 40B and sequentially shifts the gate start pulse GSP. The gate output enable GOE controls an output of the gate driver 40B.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2 and f is the input frame frequency. Hence, the controller 30 may control the operation of the panel driver 40 based on the frame frequency of (f×N) Hz. The input frame frequency is 50 Hz in a phase alternate line (PAL) scheme and 60 Hz in a national television standards committee (NTSC) scheme.

The panel driver 40 includes the data driver 40A for driving the data lines DL of the display panel 11, the gate driver 40B for driving the gate lines GL of the display panel 11, and a control voltage generator 40C for driving the discharge control lines of the display panel 11.

The data driver 40A includes a plurality of source driver integrated circuits (ICs). Each of the source driver ICs includes a shift register, a latch, a digital-to-analog converter (DAC), an output buffer, etc. The data driver 40A latches the RGB data of the 2D or 3D image in response to the data control signals SSP, SSC, and SOE. The data driver 40A converts the RGB data of the 2D/3D image into analog positive and negative gamma compensation voltages in response to the polarity control signal POL and inverts a polarity of the data voltage. The data driver 40A outputs the data voltage to the data lines DL, so that the data voltage is synchronized with a scan pulse (or a gate pulse) output from the gate driver 40B. The source driver ICs of the data driver 40A may be bonded to the lower glass substrate of the display panel 11 through a tape automated bonding (TAB) process.

The gate driver 40B generates the scan pulse, which swings between a gate high voltage and a gate low voltage, in response to the gate control signals GSP, GSC, and GOE. The gate driver 40B supplies the scan pulse to the gate lines GE in a line sequential format in response to the gate control signals GSP, GSC, and GOE. The gate driver 40B includes a gate shift register array, etc. The gate shift register array of the gate driver 40B may be formed in a non-display area outside a display area of the display panel 11, in which the pixel array is formed, in a gate-in-panel (GIP) manner. A plurality of gate shift registers included in the gate shift register array may be formed with along the pixel array in a thin film transistor (TFT) process of the pixel array in the GIP manner.

The control voltage generator 40C generates the first DC control voltage LCV1 and the second DC control voltage LCV2 and selectively supplies the first DC control voltage LCV1 and the second DC control voltage LCV2 to the discharge control lines in response to the mode selection signal SEL. The first DC control voltage LCV1 is generated at an off-level, and the second DC control voltage LCV2 is generated at a slight-on level, which is higher than the off-level and is lower than a full-on level. Further, the second DC control voltage LCV2 is at a voltage level higher than the common voltage Vcom. The first DC control voltage LCV1 and the second DC control voltage LCV2 are applied to gate electrodes of discharge control switches DST1 and DST2 shown in FIG. 8 and thus switch on or off a current path operation of the discharge control switches DST1 and DST2.

The polarized glasses 50 include a left eyeglass 50L having a left eye polarizing filter and a right eyeglass 50R having a right eye polarizing filter. The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

Figure 5B:
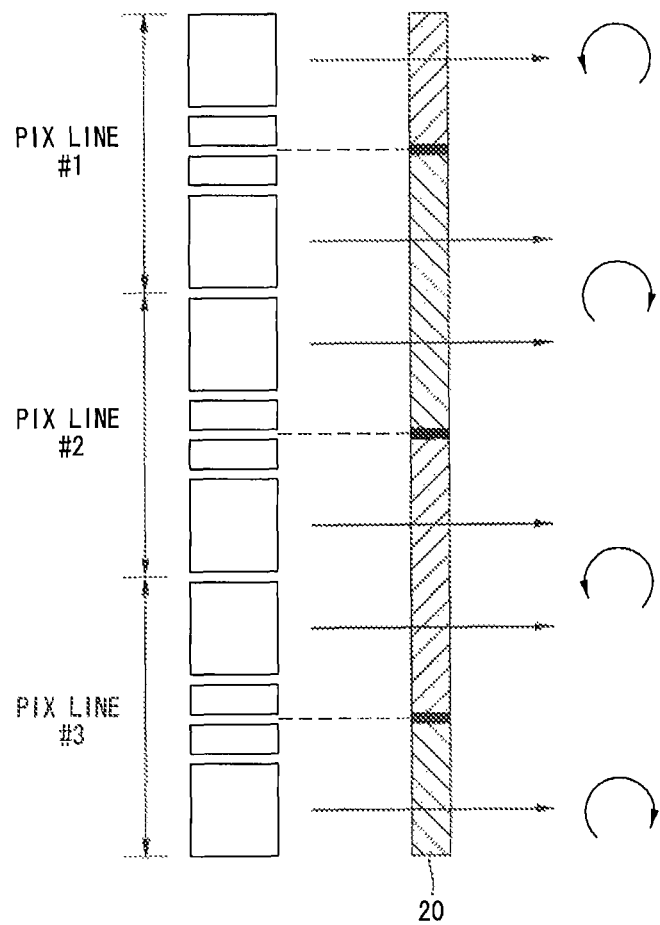
FIG. 5B illustrates an alignment state of a pixel array and a patterned retarder.

FIG. 5A illustrates one of red, green, and blue pixels shown in FIG. 4, and FIG. 5B illustrates an alignment state of the pixel array and the patterned retarder.

As shown in FIG. 5A, the pixel PIX includes an upper display unit UDIS and a lower display unit LDIS which are respectively disposed in crossing areas defined by two gate lines GL1 and GL2 and one data line DL1 in a mirror form. The lower display unit LDIS is positioned at a lower side of the upper display unit UDIS.

The upper display unit UDIS includes an upper main display unit UMP and an upper auxiliary display unit USP with the first gate line GL1 and a discharge control line CONL interposed between them. The upper main display unit UMP and the upper auxiliary display unit USP are electrically connected to the data line DL1 when the gate high voltage is applied to the first gate line GL1. The upper auxiliary display unit USP is electrically connected to a common line CL when the second DC control voltage LCV2 is applied to the discharge control line CONL.

The lower display unit LDIS includes a lower main display unit LMP and a lower auxiliary display unit LSP with the second gate line GL2 and the discharge control line CONL interposed between them. The lower main display unit LMP and the lower auxiliary display unit LSP are electrically connected to the data line DL1 when the gate high voltage is applied to the second gate line GL2. The lower auxiliary display unit LSP is electrically connected to the common line CL when the second DC control voltage LCV2 is applied to the discharge control line CONL.

In the 2D mode, the upper auxiliary display unit USP and the lower auxiliary display unit LSP display the same 2D images as the upper main display unit UMP and the lower main display unit LMP, respectively. On the other hand, in the 3D mode, the upper auxiliary display unit USP and the lower auxiliary display unit LSP display a black image, unlike the main display units UMP and LMP displaying the 3D image. Hence, the upper auxiliary display unit LISP and the lower auxiliary display unit LSP widen a vertical viewing angle of the 3D image without a reduction in a luminance of the 2D image. For this, the upper auxiliary display unit USP and lower auxiliary display unit LSP are positioned between the main display units UMP and LMP. In other words, the upper main display unit UMP, the upper auxiliary display unit USP, the lower auxiliary display unit LSP, and the lower main display unit LMP are sequentially positioned along an extension direction of the data line DL1 in the order named.

A boundary portion BP between the first and second retarders RT1 and RT2 of the patterned retarder 20 is opposite to a portion between the auxiliary display units USP and LSP, i.e., a portion between the upper display unit UDIS and the lower display unit LDIS. As a result, as shown in FIG. 5B, the first retarder RT1 overlaps the lower main display unit LMP positioned on even-numbered pixel lines (for example, a second pixel line PXL LINE#2) and the upper main display unit UMP positioned on odd-numbered pixel lines (for example, first and third pixel lines PXL LINE#1 and PXL LINE#3). Further, the second retarder RT2 overlaps the lower main display unit LMP positioned on the odd-numbered pixel lines (for example, the first and third pixel lines PXL LINE#1 and PXL LINE#3) and the upper main display unit UMP positioned on the even-numbered pixel lines (for example, the second pixel line PXL LINE#2).

Figure 6:
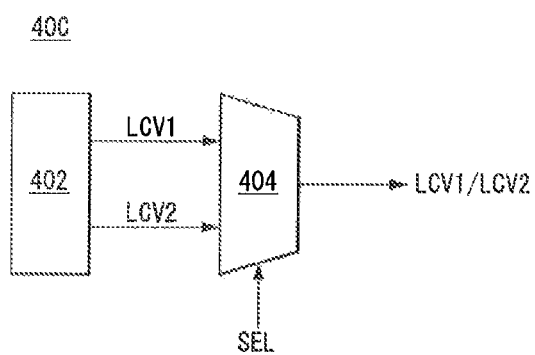
FIG. 6 illustrates a detailed configuration of a control voltage generator shown in FIG. 4.
Figure 7:
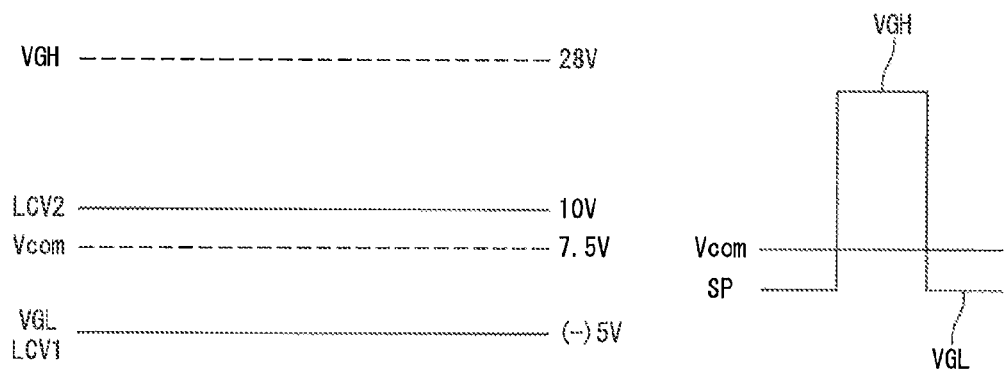
FIG. 7 illustrates levels of first and second control voltages.

FIG. 6 illustrates a detailed configuration of the control voltage generator 40C shown in FIG. 4. FIG. 7 illustrates levels of first and second control voltages.

As shown in FIG. 6, the control voltage generator 40C includes a DC-DC generator 402 and a multiplexer 404.

The DC-DC generator 402 generates the first DC control voltage LCV1 and the second DC control voltage LCV2 using an input DC power source.

As shown in FIG. 7, the first DC control voltage LCV1 may be generated at the same voltage level as a gate low voltage VGL of a scan pulse SP. When the gate low voltage VGL of the scan pulse SP capable of turning off a switch is set to about −5V, the first DC control voltage LCV1 may be about −5V or less.

As shown in FIG. 7, the second DC control voltage LCV2 may be generated at a voltage level, which is greater than the common voltage Vcom and is less than a gate high voltage VGH of the scan pulse SP. Thus, the second DC control voltage LCV2 may have a proper voltage level between the gate high voltage VGH and the common voltage Vcom, so that it can held an on-state of discharge control switches DST1 and DST2 (refer to FIG. 8) at a slight-on level. When the common voltage Vcom is about 7.5V and the gate high voltage VGH of the scan pulse SP capable of fully turning on the switch is about 28V, the second DC control voltage LCV2 may be about 10V.

The multiplexer 404 selectively outputs the first DC control voltage LCV1 and the second DC control voltage LCV2 to the discharge control line CONL in response to the mode selection signal SEL. The multiplexer 404 outputs the first DC control voltage LCV in the 2D mode and outputs the second DC control voltage LCV2 in the 3D mode.

The first and second DC control voltages LCV1 and LCV2 control operations of the discharge control switches DST1 and DST2. The second DC control voltage LCV2 of the slight-on level reduces side effects caused by a kick-back voltage. The kick-back voltage indicates a voltage shift amount ΔVP when a pixel voltage of a liquid crystal (LC) capacitor is not held at a charge level (or a discharge level) and is shifted by ΔVP at a time when the switch connected to the LC capacitor is converted from a turn-on state to a turn-off state. A reason why the kick-back voltage is generated is that the control voltage applied to a gate electrode of the switch has a pulse form. In the embodiment of the invention, because the second DC control voltage LCV2 of the slight-on level controls the operations of the discharge control switches DST1 and DST2, the generation of the kick-back voltage is prevented. Hence, the auxiliary display units USP and LSP easily implement the full black image in the 3D mode.

Figure 8:
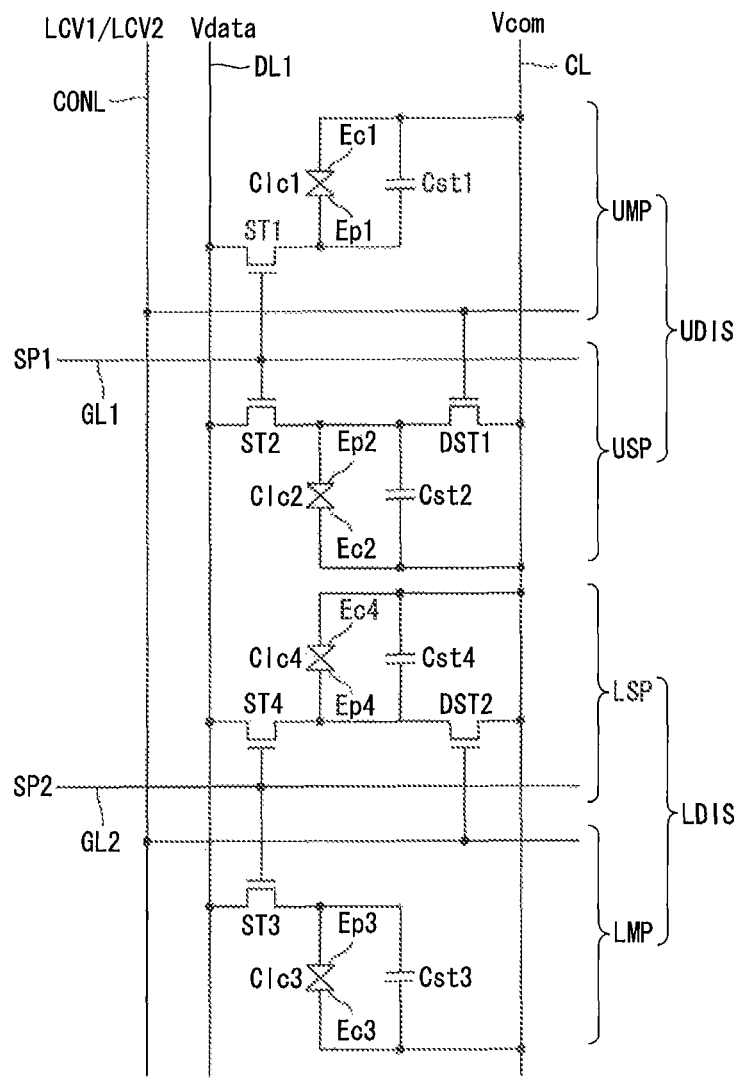
FIG. 8 illustrates in detail a connection configuration of a pixel shown in FIG. 5.
Figure 9:
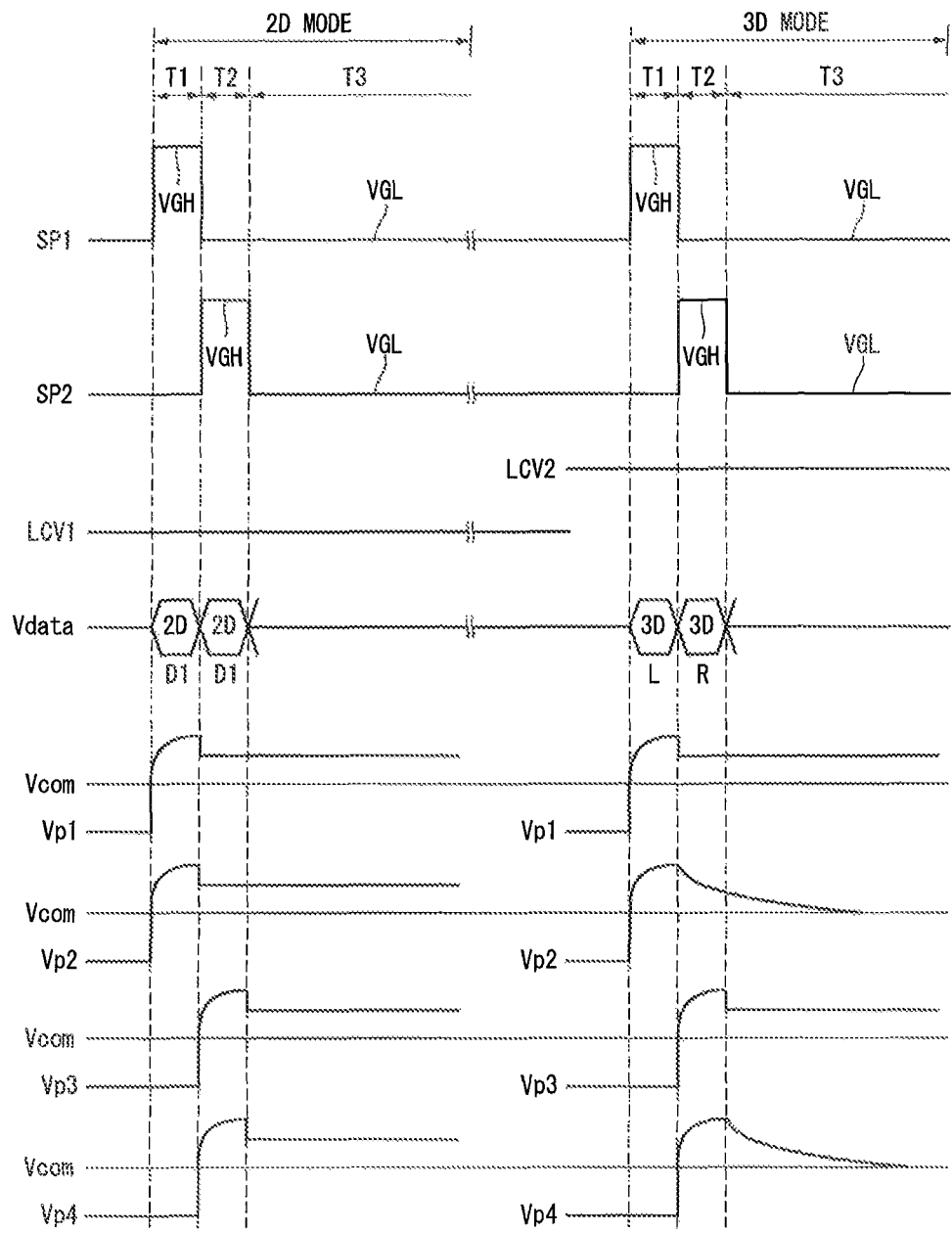
FIG. 9 is a signal waveform diagram related to charge and discharge operations of a pixel in each driving mode.
Figure 10:
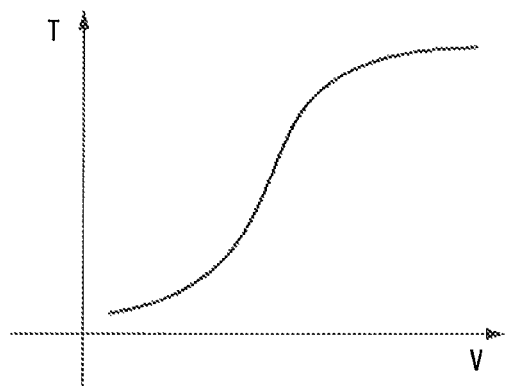
FIG. 10 is a graph illustrating a relationship between a transmittance and a voltage difference between a pixel electrode and a common electrode.
Figure 11:
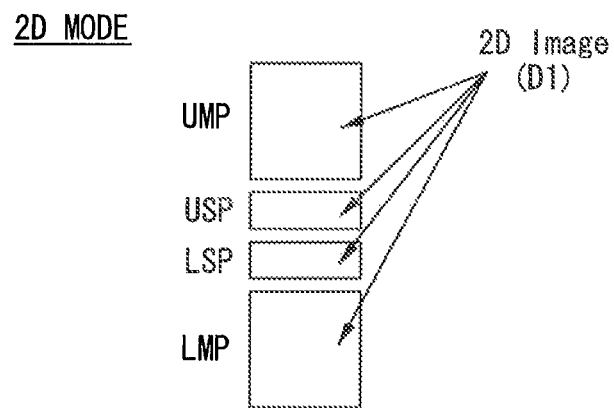
FIG. 11 illustrates a display state of a pixel in a 2D mode.
Figure 12:
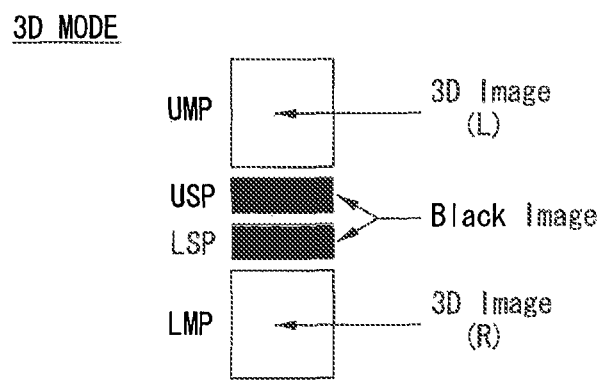
FIG. 12 illustrates a display state of a pixel in a 3D mode.
Figure 13:
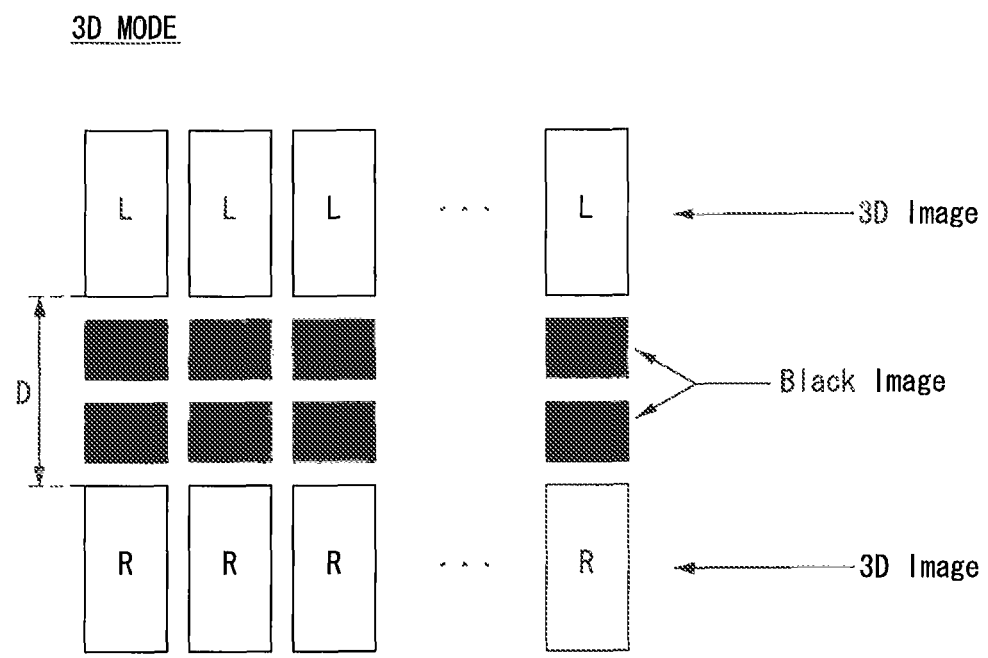
FIG. 13 illustrates that auxiliary display units perform a black stripe function in a 3D mode.

FIG. 8 illustrates in detail a connection configuration of the pixel PIX shown in FIG. 5A. FIG. 9 is a signal waveform diagram related to charge and discharge operations of the pixel PIX in each driving mode. FIG. 10 is a graph illustrating a relationship between a transmittance and a voltage difference between a pixel electrode and a common electrode. FIGS. 11 to 13 illustrate an operation effect in each driving mode.

As shown in FIG. 8, the pixel PIX includes the upper display unit UDIS and the lower display unit LDIS which are vertically disposed in the mirror form.

The upper display unit UDIS includes the upper main display unit UMP and the upper auxiliary display unit USP with the first gate line GL1, to which a first scan pulse SP1 is applied, and the discharge control line CONL, to which the first and second DC control voltages LCV1 and LCV2 are selectively applied, interposed between them.

The upper main display unit UMP includes a first pixel electrode Ep1, a first common electrode Ec1 which is opposite to the first pixel electrode Ep1 to constitute a first LC capacitor Clc1, and a first storage capacitor Cst1. The first pixel electrode Ep1 is connected to the data line DL1 through a first switch ST1. The first switch ST1 is turned on in response to the first scan pulse SP1 and thus applies a data voltage Vdata on the data line DL1 to the first pixel electrode Ep1. A gate electrode of the first switch ST1 is connected to the first gate line GL1, a source electrode of the first switch ST1 is connected to the data line DL1, and a drain electrode of the first switch ST1 is connected to the first pixel electrode Ep1. The first common electrode Ec1 is connected to the common line CL charged to the common voltage Vcom. The first storage capacitor Cst1 is formed by an overlap of the first pixel electrode Ep1 and the common line CL with an insulating layer interposed between them.

The upper auxiliary display unit USP includes a second pixel electrode Ep2, a second common electrode Ec2 which is opposite to the second pixel electrode Ep2 to constitute a second LC capacitor Clc2, and a second storage capacitor Cst2. The second pixel electrode Ep2 is connected to the data line DL1 through a second switch ST2. The second switch ST2 is turned on in response to the first scan pulse SP1 and thus applies the data voltage Vdata on the data line DL1 to the second pixel electrode Ep2. A gate electrode of the second switch ST2 is connected to the first gate line GL1, a source electrode of the second switch ST2 is connected to the data line DL1, and a drain electrode of the second switch ST2 is connected to the second pixel electrode Ep2. The second common electrode Ec2 is connected to the common line CL charged to the common voltage Vcom. The second storage capacitor Cst2 is formed by an overlap of the second pixel electrode Ep2 and the common line CL with an insulating layer interposed between them.

The second pixel electrode Ep2 is connected to the common line CL through the first discharge control switch DST1. The first discharge control switch DST1 switches on or off a current path between the second pixel electrode Ep2 and the common line CL in selective response to the first DC control voltage LCV1 and the second DC control voltage LCV2. A gate electrode of the first discharge control switch DST1 is connected to the discharge control line CONL, a source electrode of the first discharge control switch DST1 is connected to the second pixel electrode Ep2, and a drain electrode of the first discharge control switch DST1 is connected to the common line CL. When the first DC control voltage LCV1 is applied to the discharge control line CONL, the first discharge control switch DST1 completely closes a source-drain channel of the first discharge control switch DST1 and cuts off the current path between the second pixel electrode Ep2 and the common line CL. When the second DC control voltage LCV2 is applied to the discharge control line CONL, the first discharge control switch DST1 partially opens the source-drain channel of the first discharge control switch. DST1 and partially allows the current path between the second pixel electrode Ep2 and the common line CL.

The lower display unit LDIS includes the lower main display unit LMP and the lower auxiliary display unit LSP with the second gate line GL2, to which a second scan pulse SP2 is applied, and the discharge control line CONL, to which the first and second DC control voltages LCV1 and LCV2 are selectively applied, interposed between them.

The lower main display unit LMP includes a third pixel electrode Ep3, a third common electrode Ec3 which is opposite to the third pixel electrode Ep3 to constitute a third LC capacitor Clc3, and a third storage capacitor Cst3. The third pixel electrode Ep3 is connected to the data line DL1 through a third switch ST3. The third switch ST3 is turned on in response to the second scan pulse SP2 and thus applies the data voltage Vdata on the data line DL1 to the third pixel electrode Ep3. A gate electrode of the third switch ST3 is connected to the second gate line GL2, a source electrode of the third switch ST3 is connected to the data line DL1, and a drain electrode of the third switch ST3 is connected to the third pixel electrode Ep3. The third common electrode Ec3 is connected to the common line CL charged to the common voltage Vcom. The third storage capacitor Cst3 is formed by an overlap of the third pixel electrode Ep3 and the common line CL with an insulating layer interposed between them.

The lower auxiliary display unit LSP includes a fourth pixel electrode Ep4, a fourth common electrode Ec4 which is opposite to the fourth pixel electrode Ep4 to constitute a fourth LC capacitor Clc4, and a fourth storage capacitor Cst4. The fourth pixel electrode Ep4 is connected to the data line DL1 through a fourth switch ST4. The fourth switch ST4 is turned on in response to the second scan pulse SP2 and thus applies the data voltage Vdata on the data line DL1 to the fourth pixel electrode Ep4. A gate electrode of the fourth switch ST4 is connected to the second gate line GL2, a source electrode of the fourth switch ST4 is connected to the data line DL1, and a drain electrode of the fourth switch ST4 is connected to the fourth pixel electrode Ep4. The fourth common electrode Ec4 is connected to the common line CL charged to the common voltage Vcom. The fourth storage capacitor Cst4 is formed by an overlap of the fourth pixel electrode Ep4 and the common line CL with an insulating layer interposed between them.

The fourth pixel electrode Ep4 is connected to the common line CL through the second discharge control switch DST2. The second discharge control switch DST2 switches on or off a current path between the fourth pixel electrode Ep4 and the common line CL in selective response to the first DC control voltage LCV1 and the second DC control voltage LCV2. A gate electrode of the second discharge control switch DST2 is connected to the discharge control line CONL, a source electrode of the second discharge control switch DST2 is connected to the fourth pixel electrode Ep4, and a drain electrode of the second discharge control switch DST2 is connected to the common line CL. When the first DC control voltage LCV1 is applied to the discharge control line CONL, the second discharge control switch DST2 completely closes a source-drain channel of the second discharge control switch DST2 and cuts off the current path between the fourth pixel electrode Ep4 and the common line CL. When the second DC control voltage LCV2 is applied to the discharge control line CONL, the second discharge control switch DST2 partially opens the source-drain channel of the second discharge control switch DST2 and partially allows the current path between the fourth pixel electrode Ep4 and the common line CL.

The first and second discharge control switches DST1 and DST2 are designed, so that they have the same channel capacitance as the first to fourth switches ST1 to ST4. Thus, the on-states of the discharge control switches DST1 and DST2 have the slight-on level lower than the full-on level by applying the second DC control voltage LCV2 less than the gate high voltage VGH to the discharge control line CONL. Even if the second switch ST2 and the first discharge control switch DST1 are simultaneously turned on, an amount of current discharged through the first discharge control switch DST1 is less than an amount of current charged through the second switch ST2. Further, even if the fourth switch ST4 and the second discharge control switch DST2 are simultaneously turned on, an amount of current discharged through the second discharge control switch DST2 is less than an amount of current charged through the fourth switch ST4.

An operation and an operation effect of the pixel PIX having the above-described connection configuration are described below.

First, an operation of the pixel PIX in the 2D mode is described below.

As shown in FIG. 9, in the 2D mode, the discharge control switches DST1 and DST2 are continuously held in the turn-off state in response to the first DC control voltage LCV1 during periods T1 to T3.

During the period T1, the first and second switches ST1 and ST2 are simultaneously turned on at the full-on level in response to the first scan pulse SP1, which is input at the same voltage level as the gate high voltage VGH.

The first pixel electrode Ep1 of the upper main display unit UMP is charged to the data voltage Vdata for the display of the 2D image as a first pixel voltage Vp1 due to the turn-on operation of the first switch ST1. The second pixel electrode Ep2 of the upper auxiliary display unit USP is charged to the data voltage Vdata for the display of the 2D image as a second pixel voltage Vp2 due to the turn-on operation of the second switch ST2. Because the first and second switches ST1 and ST2 are equally designed, the second pixel voltage Vp2 is substantially equal to the first pixel voltage Vp1.

During the period T2, the third and fourth switches ST3 and ST4 are simultaneously turned on at the full-on level in response to the second scan pulse SP2, which is input at the same voltage level as the gate high voltage VGH.

The third pixel electrode Ep3 of the lower main display unit LMP is charged to the data voltage Vdata for the display of the 2D image as a third pixel voltage Vp3 due to the turn-on operation of the third switch ST3. The fourth pixel electrode Ep4 of the lower auxiliary display unit LSP is charged to the data voltage Vdata for the display of the 2D image as a fourth pixel voltage Vp4 due to the turn-on operation of the fourth switch ST4. Because the third and fourth switches ST3 and ST4 are equally designed, the fourth pixel voltage Vp4 is substantially equal to the third pixel voltage Vp3.

A gray value of the data voltage Vdata supplied during the period T1 may be substantially equal to or different from a gray value of the data voltage Vdata supplied during the period T2. The embodiment of the invention describes an example where the gray value of the data voltage Vdata supplied during the period T1 is substantially equal to the gray value of the data voltage Vdata supplied during the period T2. During the period T3, the first to fourth pixel voltages Vp1 to Vp4 are equally held.

During the periods T1 to T3, the common voltage Vcom is applied to the first to fourth common electrodes Ec1 to Ec4. A difference between the first pixel voltage Vp1 and the common voltage Vcom, a difference between the second pixel voltage Vp2 and the common voltage Vcom, a difference between the third pixel voltage Vp3 and the common voltage Vcom, and a difference between the fourth pixel voltage Vp4 and the common voltage Vcom are equally held. A voltage difference between the pixel electrode and the common electrode and a transmittance have a proportional relationship illustrated in FIG. 10. As a result, as shown in FIG. 11, the main display units UMP and LMP and the auxiliary display units USP and LSP implement the 2D image of the same gray level. In this instance, the 2D image displayed on the auxiliary display units USP and LSP functions to increase the luminance of the 2D image.

Next, an operation of the pixel PIX in the 3D mode is described below.

As shown in FIG. 9, in the 3D mode, the discharge control switches DST1 and DST2 are continuously held in the on-state of the slight-on level in response to the second DC control voltage LCV2 during the periods T1 to T3.

During the period T1, the first and second switches ST1 and ST2 are simultaneously turned on at the full-on level in response to the first scan pulse SP1, which is input at the same voltage level as the gate high voltage VGH.

The first pixel electrode Ep1 of the upper main display unit UMP is charged to the data voltage Vdata for the display of the 3D image for left eye as the first pixel voltage Vp1 due to the turn-on operation of the first switch ST1. The second pixel electrode Ep2 of the upper auxiliary display unit USP is charged to the data voltage Vdata for the display of the 3D image for left eye as the second pixel voltage Vp2 due to the turn-on operation of the second switch ST2.

During the period T1, an equivalent resistance of the second switch ST2 having the on-state of the full-on level is much less than an equivalent resistance of the first discharge control switch DST1 having the on-state of the slight-on level. Thus, a charge current entering into the second pixel electrode Ep2 is much more than a discharge current releasing from the second pixel electrode Ep2. As a result, because the first discharge control switch DST1 having the on-state of the slight-on level hardly affects the charge characteristic of the second pixel voltage Vp2 during the period T1, the second pixel voltage Vp2 is charged to the level similar to the first pixel voltage Vp1.

During the period T2, the first and second switches ST1 and ST2 are simultaneously turned off in response to the first scan pulse SP1, which is input at the same voltage level as the gate low voltage VGL. Further, during the period T2, the third and fourth switches ST3 and ST4 are simultaneously turned on at the full-on level in response to the second scan pulse SP2, which is input at the same voltage level as the gate high voltage VGH.

During the period T2, the first pixel voltage Vp1, which has been charged to the first pixel electrode Ep1 of the upper main display unit UMP, is held at a constant level. On the other hand, the second pixel voltage Vp2, which has been charged to the second pixel electrode Ep2 of the upper auxiliary display unit USP, is gradually discharged to the level of the common voltage Vcom because of the discharge current through the first discharge control switch DST1.

During the period T2, the third pixel electrode Ep3 of the lower main display unit LMP is charged to the data voltage Vdata for the display of the 3D image for right eye as the third pixel voltage Vp3 due to the turn-on operation of the third switch ST3. The fourth pixel electrode Ep4 of the lower auxiliary display unit LSP is charged to the data voltage Vdata for the display of the 3D image for right eye as the fourth pixel voltage Vp4 due to the turn-on operation of the fourth switch ST4.

During the period T2, an equivalent resistance of the fourth switch ST4 having the on-state of the full-on level is much less than an equivalent resistance of the second discharge control switch DST2 having the on-state of the slight-on level. Thus, a charge current entering into the fourth pixel electrode Ep4 is much more than a discharge current releasing from the fourth pixel electrode Ep4. As a result, because the second discharge control switch DST2 having the on-state of the slight-on level hardly affects the charge characteristic of the fourth pixel voltage Vp4 during the period T2, the fourth pixel voltage Vp4 is charged to the level similar to the third pixel voltage Vp3.

During the period T3, the third and fourth switches ST3 and ST4 are simultaneously turned off in response to the second scan pulse SP2, which is input at the same voltage level as the gate low voltage VGL.

During the period T3, the third pixel voltage Vp3, which has been charged to the third pixel electrode Ep3 of the lower main display unit LMP, is held at a constant level. On the other hand, the fourth pixel voltage Vp4, which has been charged to the fourth pixel electrode Ep4 of the lower auxiliary display unit LSP, is gradually discharged to the level of the common voltage Vcom because of the discharge current through the second discharge control switch DST2.

A gray value of the data voltage Vdata supplied during the period T1 may be substantially equal to or different from a gray value of the data voltage Vdata supplied during the period T2. The embodiment of the invention describes an example where the gray value of the data voltage Vdata supplied during the period T1 is substantially equal to the gray value of the data voltage Vdata supplied during the period T2.

During the periods T1 to T3, the common voltage Vcom is applied to the first to fourth common electrodes Ec1 to Ec4. A difference between the first pixel voltage Vp1 and the common voltage Vcom is substantially equal to a difference between the third pixel voltage Vp3 and the common voltage Vcom. After a predetermined time of the period T3 passed, a difference between the second pixel voltage Vp2 and the common voltage Vcom becomes substantially zero, unlike the difference between the first pixel voltage Vp1 and the common voltage Vcom. Further, a difference between the fourth pixel voltage Vp4 and the common voltage Vcom becomes substantially zero, unlike the difference between the third pixel voltage Vp3 and the common voltage Vcom. As a result, according to the voltage difference (V)-transmittance (T) characteristic illustrated in FIG. 10, as shown in FIG. 12, the main display units UMP and LMP display the 3D image of a predetermined gray level, and the auxiliary display units USP and LSP display the image of a black gray level. In this instance, the auxiliary display units USP and LSP serve as an active black stripe.

As shown in FIG. 13, the black image displayed on the auxiliary display units USP and LSP increases a display distance D between the 3D images (i.e., between the left eye image L and the right eye image R), which are adjacent to each other in a vertical direction. Hence, the 3D vertical viewing angle, at which a crosstalk is not generated, may be widely secured through the black image without a separate black stripe pattern.

FIGS. 14 to 17 illustrate an example where the data voltages Vdata having different gray values are applied to an upper display unit and a lower display unit of each pixel.

More specifically, FIGS. 14 to 17 illustrate charge and discharge signal waveform and a display state of two pixels PIX1 and PIX2 which are commonly connected to one data line and are vertically adjacent to each other. Each of the two pixels PIX1 and PIX2 has the above-described connection configuration.

A first gate line, to which a first scan pulse SP1 is applied, and a second gate line, to which a second scan pulse SP2 is applied, are assigned to the first pixel PIX1. Further, a third gate line, to which a third scan pulse SP3 is applied, and a fourth gate line, to which a fourth scan pulse SP4 is applied, are assigned to the second pixel PIX2.

Figure 14:
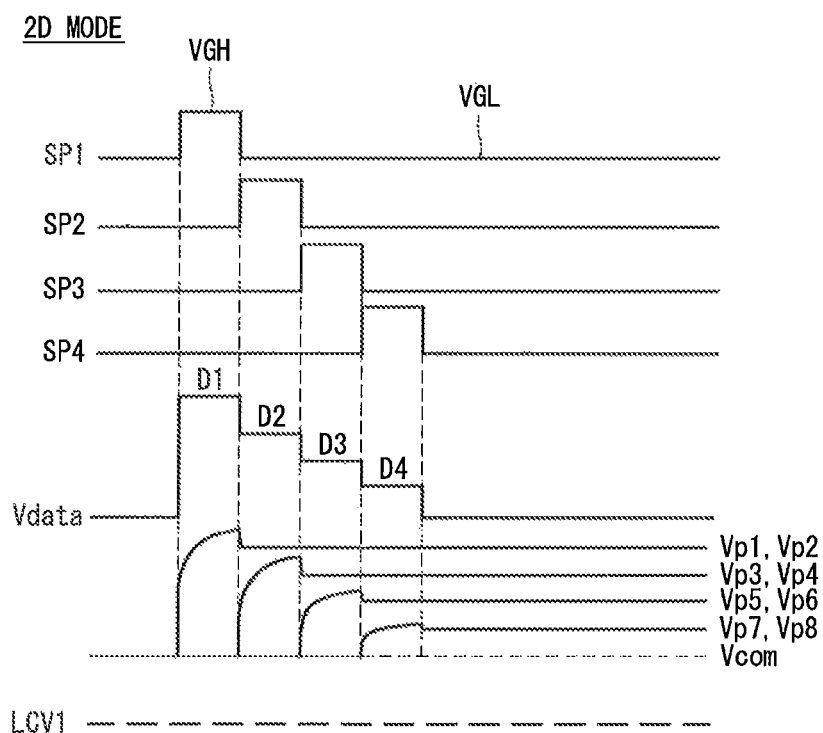
FIGS. 14 and 15 illustrate charge and discharge signal waveform and a display state when data voltages having different gray values are applied to an upper display unit and a lower display unit of each pixel in a 2D mode.
Figure 15:
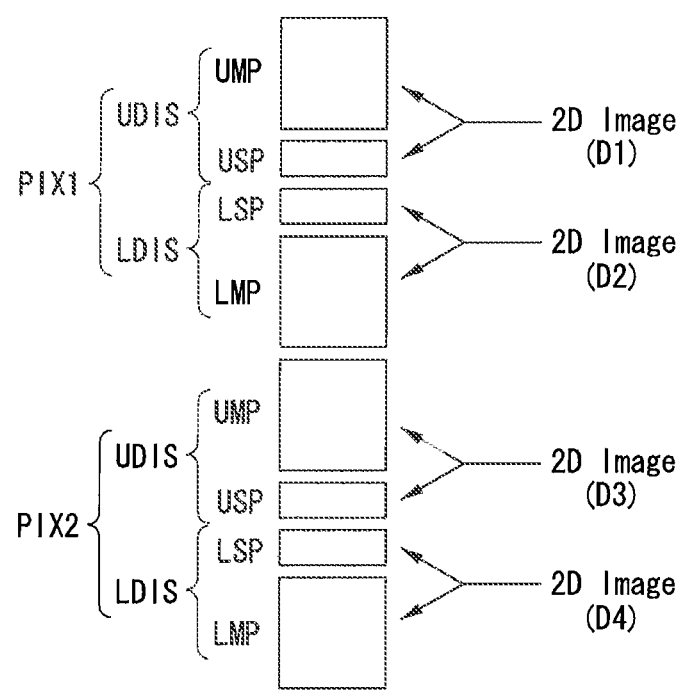

As shown in FIGS. 14 and 15, in the 2D mode, an upper display unit UDIS of the first pixel PIX1 displays a 2D image corresponding to a first gray value D1 in response to the first scan pulse SP1, and a lower display unit LDIS of the first pixel PIX1 displays a 2D image corresponding to a second gray value D2 in response to the second scan pulse SP2. Further, an upper display unit UDIS of the second pixel PIX2 displays a 2D image corresponding to a third gray value D3 in response to the third scan pulse SP3, and a lower display unit LDIS of the second pixel PIX2 displays a 2D image corresponding to a fourth gray value D4 in response to the fourth scan pulse SP4. Hence, a resolution of the 2D image increases to about two times a resolution in the above-described embodiment.

Figure 16:
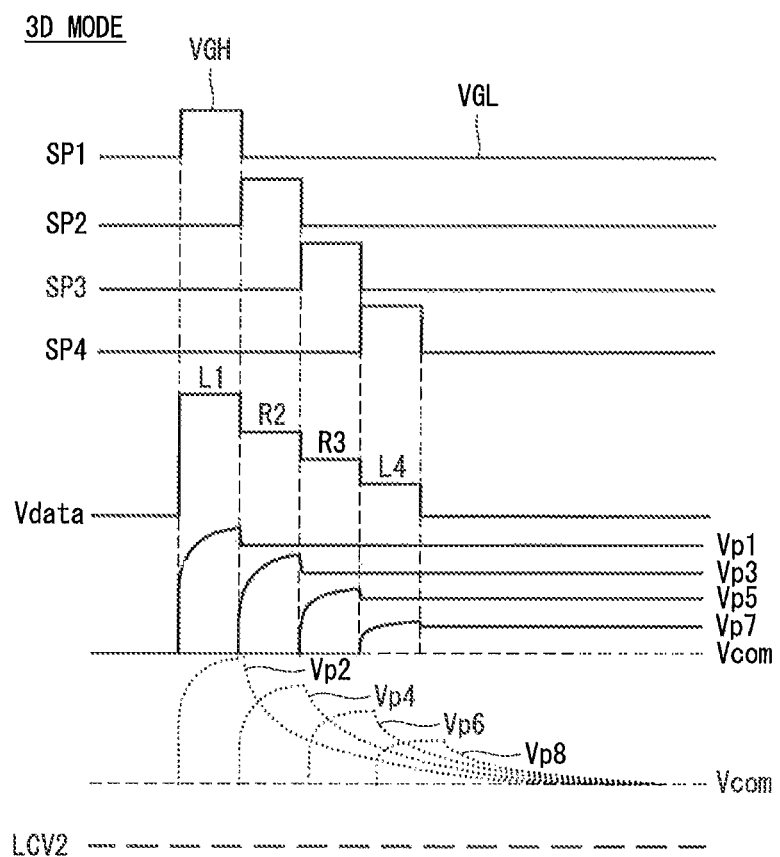
FIGS. 16 and 17 illustrate charge and discharge signal waveform and a display state when data voltages having different gray values are applied to an upper display unit and a lower display unit of each pixel in a 3D mode.
Figure 17:
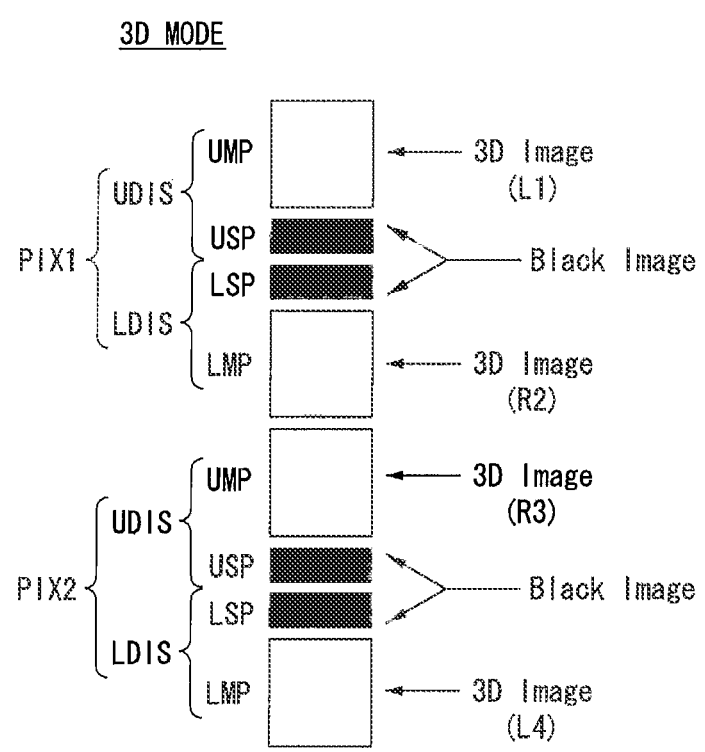

As shown in FIGS. 16 and 17, in the 3D mode, the upper display unit UDIS of the first pixel PIX1 displays the 3D image for left eye corresponding to a first gray value L1 and a black image in response to the first scan pulse SP1 and the second DC control voltage LCV2, and the lower display unit LDIS of the first pixel PIX1 displays a black image and the 3D image for right eye corresponding to a second gray value R2 in response to the second scan pulse SP2 and the second DC control voltage LCV2. Further, the upper display unit UDIS of the second pixel PIX2 displays the 3D image for right eye corresponding to a third gray value R3 and a black image in response to the third scan pulse SP3 and the second DC control voltage LCV2, and the lower display unit LDIS of the second pixel PIX2 displays a black image and the 3D image for left eye corresponding to a fourth gray value L4 in response to the fourth scan pulse SP4 and the second DC control voltage LCV2. Hence, a resolution of the 3D image increases to about two times a resolution in the above-described embodiment.

As described above, the image display device according to the embodiment of the invention configures the pixels, so that each pixel includes the upper display unit and the lower display unit, which are vertically disposed in the mirror form, and each of the upper display unit and the lower display unit includes the main display unit and the auxiliary display unit. Further, in the image display device according to the embodiment of the invention, each of the auxiliary display units disposed between the main display units of each pixel has the discharge control switch, and the discharge operation of the discharge control switch is controlled through the DC control voltage of the slight-on level. Hence, in the 3D mode, the auxiliary display units serve as the active black stripe. Further, in the 2D mode, the discharge operation of the discharge control switch is cut off through the DC control voltage of the off-level. As a result, the image display device according to the embodiment of the invention can secure the wider vertical viewing angle of the 3D image without a reduction in the luminance of the 2D image.

Furthermore, in the image display device according to the embodiment of the invention, the gray values of the data voltages applied to the upper display unit and the lower display unit may be substantially equal to or different from one another. Hence, the resolutions of the 2D and 3D images can be easily adjusted.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
   a display panel including a plurality of pixels and configured to operate in a 2D mode and a 3D mode;
   a patterned retarder including a first retarder and a second retarder for dividing light from the display panel into first polarized light and second polarized light, respectively; and
   a control voltage generator configured to generate a first DC control voltage of an off-level and a second DC control voltage of a slight-on level, which is higher than the off-level and is lower than a full-on level, and selectively output the first DC control voltage and the second DC control voltage depending on a driving mode,
   wherein each of the plurality of pixels includes an upper display unit and a lower display unit, which are vertically disposed in a mirror form,
   wherein the upper display unit includes an upper main display unit and an upper auxiliary display unit which are adjacent to each other, and the lower display unit includes a lower main display unit and a lower auxiliary display unit which are adjacent to each other, and
   wherein the lower main display unit is disposed on a lower side of the upper main display unit along a vertical direction, and the upper auxiliary display unit and the lower auxiliary display unit are disposed adjacent to each other between the upper main display unit the lower main display unit, the first retarder overlaps the lower display unit in a first pixel and the upper display unit in a second pixel next to the first pixel in a vertical direction.

2. The image display device of claim 1, wherein in the 2D mode, the upper main display unit and the upper auxiliary display unit display the same 2D image, and the lower main display unit and the lower auxiliary display unit display the same 2D image,
   wherein in the 3D mode, the upper main display unit and the lower main display unit display a 3D image, and the upper auxiliary display unit and the lower auxiliary display unit display a black image.

3. The image display device of claim 1, wherein gray values of data voltages applied to the upper display unit and the lower display unit are substantially equal to one another.

4. The image display device of claim 1, wherein gray values of data voltages applied to the upper display unit and the lower display unit are different from one another.

5. An image display device comprising:
   a display panel including a plurality of pixels and configured to operate in a 2D mode and a 3D mode;

a patterned retarder configured to divide light from the display panel into first polarized light and second polarized light; and a control voltage generator configured to generate a first DC control voltage of an off-level and a second DC control voltage of a slight-on level, which is higher than the off-level and is lower than a full-on level, and selectively output the first DC control voltage and the second DC control voltage depending on a driving mode, wherein each of the plurality of pixels includes an upper display unit and a lower display unit, which are vertically disposed in a mirror form, wherein the upper display unit includes an upper main display unit and an upper auxiliary display unit which are adjacent to each other, and the lower display unit includes a lower main display unit and a lower auxiliary display unit which are adjacent to each other, wherein the lower main display unit is disposed on a lower side of the upper main display unit along a vertical direction, and the upper auxiliary display unit and the lower auxiliary display unit are disposed adjacent to each other between the upper main display unit the lower main display unit, and wherein each of the plurality of pixels includes:

an upper main display unit including a first pixel electrode connected to a data line through a first switch;

an upper auxiliary display unit including a second pixel electrode connected to the data line through a second switch, which is driven at the same timing as the first switch, and a first discharge control switch for selectively connecting the second pixel electrode to a common line charged to a common voltage depending on the driving mode;

a lower main display unit including a third pixel electrode connected to the data line through a third switch; and a lower auxiliary display unit including a fourth pixel electrode connected to the data line through a fourth switch, which is driven at the same timing as the third switch, and a second discharge control switch for selectively connecting the fourth pixel electrode to the common line depending on the driving mode.

6. The image display device of claim 5, wherein the first and second discharge control switches are turned off by the first DC control voltage in the 2D mode and are in a slight-on state by the second DC control voltage in the 3D mode.

7. The image display device of claim 5, wherein the display panel further includes a discharge control line, to which the first DC control voltage and the second DC control voltage are selectively applied, wherein the first discharge control switch has a gate electrode connected to the discharge control line, a source electrode connected to the second pixel electrode, and a drain electrode connected to the common line, wherein the second discharge control switch has a gate electrode connected to the discharge control line, a source electrode connected to the fourth pixel electrode, and a drain electrode connected to the common line.

8. The image display device of claim 5, wherein the first discharge control switch cuts off a current path between the second pixel electrode and the common line in the 2D mode, wherein the first discharge control switch allows the current path between the second pixel electrode and the common line and discharges a voltage charged to the second pixel electrode to a level of the common voltage in the 3D mode.

9. The image display device of claim 5, wherein the second discharge control switch cuts off a current path between the fourth pixel electrode and the common line in the 2D mode, wherein the second discharge control switch allows the current path between the fourth pixel electrode and the common line and discharges a voltage charged to the fourth pixel electrode to a level of the common voltage in the 3D mode.

10. The image display device of claim 5, wherein the first switch and the second switch are connected to a first gate line and are simultaneously turned on and off by a first scan pulse applied to the first gate line, wherein the third switch and the fourth switch are connected to a second gate line and are simultaneously turned on and off by a second scan pulse applied to the second gate line.

* * * * *